United States Patent [19]

Gealt

[11] Patent Number: 4,815,549
[45] Date of Patent: Mar. 28, 1989

[54] PORTABLE WEIGHING DEVICE HAVING IMPROVED RESOLUTION

[76] Inventor: Arthur E. Gealt, 6802 N. 11th St., Philadelphia, Pa. 19126

[21] Appl. No.: 164,019

[22] Filed: Mar. 4, 1988

Related U.S. Application Data

[62] Division of Ser. No. 118,197, Nov. 9, 1987.

[51] Int. Cl.$^4$ .......................... G01G 23/26; G01L 1/04
[52] U.S. Cl. .................................... 177/234; 73/862.62
[58] Field of Search ................... 177/231–234; 73/862.62

[56] References Cited

U.S. PATENT DOCUMENTS

| | | | |
|---|---|---|---|
| 1,724,993 | 8/1929 | Coker | 73/862.62 X |
| 2,365,693 | 12/1944 | Garwood | 73/862.62 |
| 2,612,042 | 9/1952 | Clarke | 177/234 X |
| 3,073,155 | 1/1963 | Ianuzzi | 73/862.62 |

Primary Examiner—George H. Miller, Jr.
Attorney, Agent, or Firm—Woodcock Washburn Kurtz Mackiewicz & Norris

[57] ABSTRACT

A portable device for weighing objects is provided in which the object being weighed is supported against gravity by a self-aligning tension spring and a supporting frame. The device utilizes an indicator which carries no substantial part of the load, but senses the position of the lower, free end of the resilient measuring means, through the use of an activator probe, self-aligned with the resilient measuring means. The device can further provide high resolution to one part in one thousand while minimizing the inherent non-linearity in the no-load portion of its spring deflection curve.

21 Claims, 2 Drawing Sheets

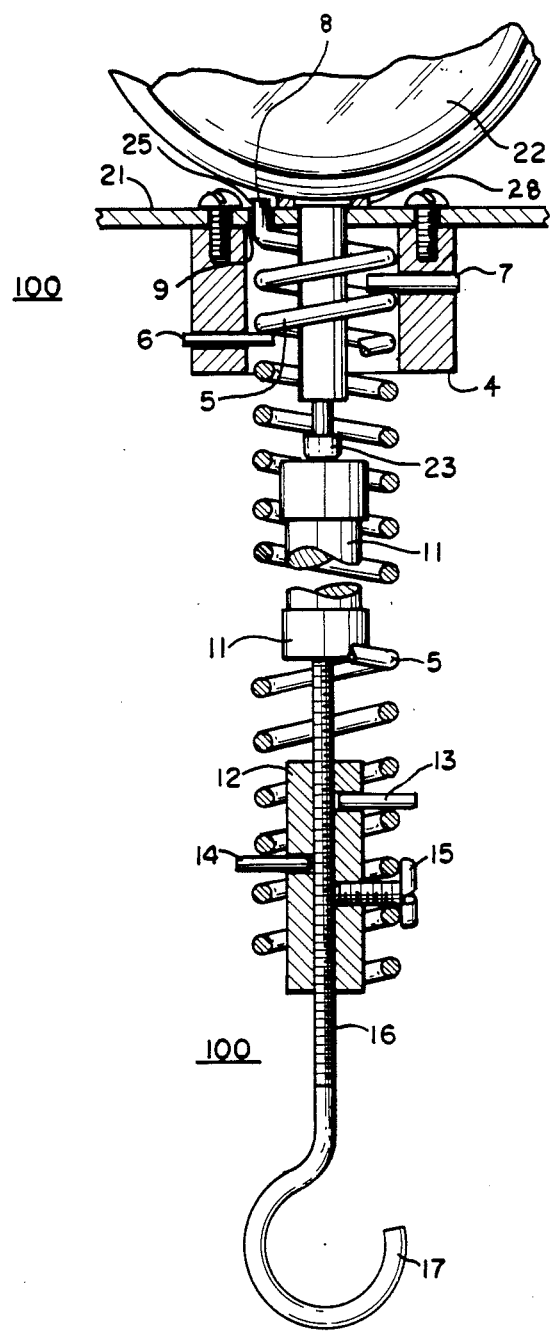

PORTABLE WEIGHING DEVICE HAVING IMPROVED RESOLUTION

This is a division of application Ser. No. 118,197, filed 11/9/87.

This invention relates to weighing devices having improved resolution, and in particular, to weighing devices that minimize back-lash and freeplay errors to provide more accurate weight measurements.

BACKGROUND OF THE INVENTION

Currently available portable scales now teach a dial graduated to indicate desired weight units, a rotatable pointer adapted to cooperate with said dial and spring controlled rack and gear means for actuating the pointer. These devices may also contain main load springs arranged to accept the load of heavier weights and to communicate with the spring controlled rack and gear means.

It is generally known that the relationship between the force and displacement of a coil spring is non-linear in the early portion of the curve illustrating the relationship between force and displacement for a given spring. It is also known that within this non-linear portion of the curve, an increasing amount of force is necessary to displace the spring each additional unit of distance. This phenomenon normally results in an inaccurate weight measurement.

This problem has been addressed in prior art devices by providing a secondary spring, in addition to the main loading spring, which works against the main loading spring in the early portion of the curve by exerting an initial force on the main spring. See for example, Clarke, U.S. Pat. No. 2,612,042, disclosing a force measuring device. This patent discloses a measuring device that includes two main springs for absorbing the load and an additional secondary spring working against the main springs to compensate for manufacturing errors in the main springs and to minimize the inaccuracy illustrated by the non-linear portion of the force vs. displacement curve. While the use of a secondary spring places the operating range of this device outside the lower non-linear part of the force vs. displacement curve, the additional spring adds to the product's cost and increases the anchoring problems of the device. Furthermore, because of these and other errors associated with a plurality of loading springs, the resolution of this device is sacrificed, e.g. Clarke shows a resolution of only one part in 100.

In addition to the above, Clarke teaches that the pre-load spring gradient can be varied through the use of an adjusting abutment and nut. The addition of this added mechanism, while permitting corrections for errors inherent in the springs and errors caused by temperature conditions, causes inaccuracies associated with additional moving parts that wear with continued use.

Prior art devices, like Clarke's scale, usually require spring bearings, thin steel members having spiral cut out portions therein, or side restraints to position the main load springs. While these elements keep the springs from moving laterally, they too add to the overall inaccuracy of the device through "dead band" effects, frictional errors created by the moving parts of the scale that create errors in the readings.

Accordingly, there is still a need for a spring weighing device that minimizes friction and dead-band errors in reading weight measurements. There is also a need for a spring scale having greater resolution that permits adjustment for peripherals and tare with no secondary effect on the spring gradient or the span of the instrument.

SUMMARY OF THE INVENTION

In accordance with the teachings of this invention, a spring scale is provided employing a high resolution depth gauge-type indicator and complementary activator probe means disposed on a frame, whereby the improved sensitivity of the indicator is employed for measuring weight. The invention further employs a single resilient measuring means, preferably a tension spring anchored to the frame and axially disposed about an extension member abutting the activator probe means of the preferred dial indicator. Since the single spring is self-aligning, there are no bearings or other side constraints which can introduce dead-band, or "back-lash" errors. As used herein "back-lash errors refer to those errors in readings caused by imperfect gear alignment in the indicator means.

Accordingly, this invention provides a spring scale that reduces the errors associated with added pre-loading springs and bearings of prior art devices.

Further, according to this invention, the indicator means is completely independent of the load-bearing forces, thereby minimizing friction and attendant errors in the readings. The indicator can therefore provide far greater resolution, preferably one part in five hundred, and more preferably one part in one thousand. This is a significant improvement over prior art devices which usually have a resolution of one part in one hundred, such as the aforementioned Clarke patent.

In another important aspect of this invention, the main spring is preferably anchored at both ends with fasteners that pre-load the ends of the spring to eliminate any free play which could also produce "back-lash" errors. Additionally, the gradient of the main spring of this invention can be adjusted by varying the portion of it that is active, rather than by adjusting an additional spring working against the main spring, as known to the prior art.

The pre-loading of the resilient measuring means, or preferred main spring of this invention, is accomplished by an internal resilient means inherently within the indicator. Thus, the use of a secondary spring, as taught by Clarke, is eliminated while still avoiding the inherent non-linearity in the no-load end of the spring deflection curve. Finally, the zero, or reading under no-load, is adjustable to accommodate variables in attachment accessories, or tare, with no corollary effect on the spring gradient or span of the scale.

OBJECTS OF THE INVENTION

It is, therefore, an object of this invention to provide a weighing device that supports an object against gravity by a self-aligning deflection spring without the use of slides or bearings used to support and restrain prior art measuring springs. It is another object of this invention to provide a weighing device having an indicator which carries no substantial part of the load, but senses the position of the lower, free end of the spring by means of an extension member, self-aligned within the spring.

It is still another object of this invention to provide a weighing device having greater resolution than prior art devices.

It is still another object of this invention to provide a weighing device having a measuring spring with ends pre-loaded outside of its working span to minimize back-lash errors.

It is still another object of this invention to provide a spring-based weighing device that permits adjustments to the gradient of the measuring spring by adjusting the span of the spring.

It is still another object of this invention to provide a weighing device that does not exhibit non-linearity at the no-load end of the deflection-vs-force curve.

With these objects in view, this invention resides in the novel construction, combination, arrangement of parts and methods substantially as hereinafter described and more particularly defined by the attached claims.

BRIEF DESCRIPTION OF THE DRAWINGS

The accompanying drawings illustrate a complete embodiment of the invention according to the best mode so far devised for the practical application of the principles thereof, and in which:

FIG. 2 is an enlarged detail of a front cross-sectional view of the collar of the weighing device of FIG. 1;

FIG. 3 is an enlarged detail of a front cross-sectional view of the calibration means of the weighing device of FIG. 1.

DETAILED DESCRIPTION OF THE INVENTION

Figure 1:
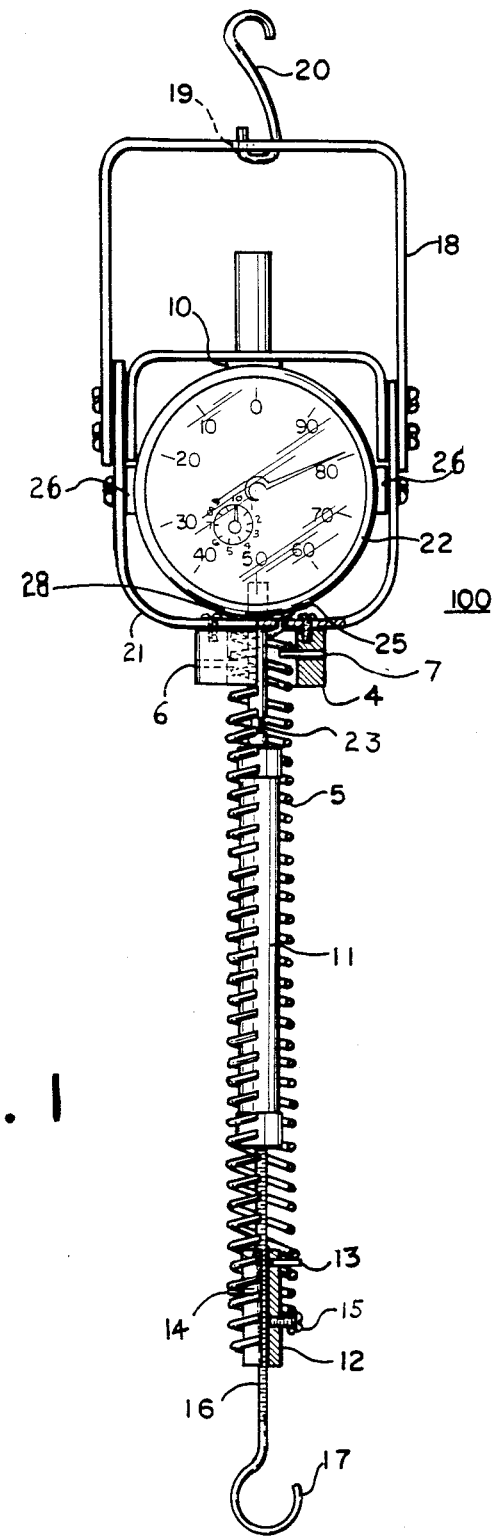
FIG. 1 is a front elevation of a preferred weighing device of this invention, with the spring cut away to reveal the extension member, and illustrating cross-sectional views of the collar and calibration means.

FIGS. 1-3 illustrate, in front and cross-sectional views, a weighing device embodying the teachings of this invention.

The weighing device 100 includes a supporting frame 21 and indicator means 22 disposed on the frame 21. Extending from the indicator means 22 is an activator probe means 23 which is slidably mounted to the indicator means 22. This activator probe means 23 engages the internal resilient means in a manner well-known to those familiar with the construction of depth gauges and spring scales. The indicator means 22 includes an internal resilient means (not shown) for causing said indicator means 22 to provide a reading proportional to the displacement of the sensing end of the activator probe 23. Further according to this novel construction, a resilient measuring means 5 is attached to the frame 21 for supporting the weight of an object. The resilient measuring means 5 is disposed in tension in an amount sufficient to cause the calibration curve of the device to be substantially linear. Disposed within the resilient measuring means 5, and attached thereto, is an extension member The extension member 11 is arranged to abut the activator probe means 23. The extension member 11 and the resilient measuring means 5 apply a compressive force to the activator probe means 23 to cause the internal resilient means of the indicator 22 to be compressed prior to weighing an object.

The preferred resilient measuring means of this invention comprises a tension spring 5 having a plurality of turns. More preferably, this tension spring 5 is self-aligning and axially disposed around the extension member 11. This spring can be attached to the frame 21, whereby an end of the spring is disposed through aperture 25 and a plurality of turns of the spring are fixed in collar 4. In accordance with the teachings of this invention, the measuring spring 5 is pre-loaded by the light load of the indicator 22, eliminating the inherent non-linearity in the no-load end of a normal spring deflection curve. The opposing force within the indicator is conceivably about 20 grams and additional pre-loading is anticipated by accessories, for example, baskets, sacks, or other carriers, designed to hold the object to be weighed. The opposing force of the indicator alone or in combination with the accessories, pre-loads the main spring 5 to render the calibration curve of the scale to be essentially linear.

Because of the light load exerted on the indicator 22, the use of a standard industrial indicator with a resolution of one part in one thousand may be implemented. As FIG. 1 indicates, a standard ten turn indicator meeting Group 2 characteristics of the American Gauge Design Standards AN51 B89.1.10-1978) can be used. This preferred gauge has an outer dial divided into one hundred parts, and a secondary dial which counts up to ten revolutions, providing a final resolution of one part in one thousand. It is also anticipated that a less sensitive resolution, i.e. about 1 in 500, could be useful for many applications.

As described in FIG. 1, the indicator 22 is fastened to the frame 21 preferably by means of bushings 10, 26 and 28. Bushings 10 and 26 are designed to accommodate variations in production parts and preferably are fabricated from natural or synthetic rubber materials. Bushing 28, on the other hand, provides firm support for the indicator 22 with respect to the frame 21, and therefore, preferably is fabricated from metal or a less resilient material. It is important that the lower bushing 28, secure the indicator 22 because any motion between them would result in a change of reading.

Referring now to FIGS. 2 and 3, means for minimizing back-lash errors are depicted. The invention prescribes the use of fasteners, preferably locating pins 6 and 7, for pre-loading the upper end of the main measuring spring 5 The end of the spring 5 comprises an anchoring portion 8 which preferably is disposed in aperture 25 of the frame 21, per FIG. 2. The tension spring is preferably attached to the collar 4 at at least two points, whereby the spring 5 is disposed in compression above these points. More preferably, when the collar 4 is assembled to the frame 21, the turns of the spring above the pins 6 and 7 are compressed to pre-load the spring against a first set of fasteners, depicted as pins 6 and 7. This procedure minimizes the incidence of backlash errors in the upper end of the measuring spring 5.

This invention can also include calibration means. In accord with a preferred embodiment, such means can include calibration cylinder 12 attached coaxially and in sliding engagement with the preferred tension spring 5 by at least a second set of fasteners, such as preferred pins 13 and 14. This second set of fasteners is preferably disposed to create compression in a lower end portion of the spring whereby backlash errors are further reduced. In a most preferred embodiment, depicted in FIG. 3, two pins 13 and 14 project from the calibration cylinder 12 and are fitted between the turns of the spring 5. A locking screw 13 can be engaged with at least one turn, preferably two turns, of the spring 5 and tightened against the spring to prevent movement.

In accordance with another important feature of this invention, the calibration means includes an object holding apparatus, preferably a hook 17, disposed at a lower end of the spring 5. The object holding apparatus can preferably include a rod portion 16 disposed in threaded engagement with the calibration cylinder 12 and arranged to abut said extension member 11 whereby a rotation of the holding apparatus 16 causes a linear translation of the extension member 11 thereby displacing said extension member 11 against said activator probe means 23 which, in turn, impinges the internal resilient means to change the zero adjustment of the device. In this way the preferred holding apparatus can provide adjustment for peripherals or tare with no secondary effect on the spring gradient or the span of the instrument. The upper end of the rod portion 16 is designed to impinge the lower end of the extension member 11, moving it upward against the activator probe 23 until the dial indicator 22 reads zero with no load on the scale. This adjustment forces the probe 23 of the indicator 22 to its innermost position, and the opposing force within the indicator 22 acts to pre-load the measuring spring 5.

Further according to FIG. 3, the calibration cylinder 12 thusly disposed in threaded engagement with rod portion 16, can be rotated with respect to the spring 5, to cause a repositioning of a second set of fasteners, preferably pins 13 and 14, within the turns of the spring 5, thereby changing the spring gradient. Gradient changes can therefore be accomplished by varying the portion of the spring carrying the load rather than the prior art technique of using an additional spring working against the main spring. In the preferred design, the two pins 13 and 14 project from the calibration means 12 and a preferred locking screw 15 is tightened against the spring once the desired gradient is selected. The degree of insertion of the calibration cylinder 12 into the spring 5 determines the active length of the spring, and the number of its active turns. This adjustment sets the gradient of the spring and hence, the span of the instrument.

These teachings are not limited to weighing devices, and can be applied to springs used in instrumentation and other industrial applications. In accordance with this variation of the invention, adjustments to spring gradients can be accomplished by disposing at least two load impingement members within the turns of a spring. The load impingement members, similar to the preferred pins above, are disposed to define a first active spring length. By repositioning at least one of these members to define a second active spring length, the spring gradient of such springs can be adjusted. Ideally, this method can be performed on helical coil springs, and it is contemplated that both compression and tension springs can be used.

In addition to the above, a bracket 18 can be attached to the upper end of the frame 21 of the preferred embodiment to serve as a handle for hand-held measurements. Moreover, support means, such as hole 19 can be provided in the bracket 18 for inserting a hook 20, or other similar device, for those applications where a fixed support is preferred.

From the foregoing it can be realized that this invention provides an improved weighing device exhibiting fewer dead-band and back-lash errors The device provides for improved resolution comparable with bulky and delicate balance-beam scales while still maintaining its light weight and portability. The device is particularly useful for weighing infants in home visits by healthcare workers, but is equally useful in many industrial applications. Although various embodiments have been illustrated, this was for the purpose of describing, but not limiting, the invention. Various modifications, which will become apparent to one skilled in the art, are within the scope of this invention described in the attached claims.

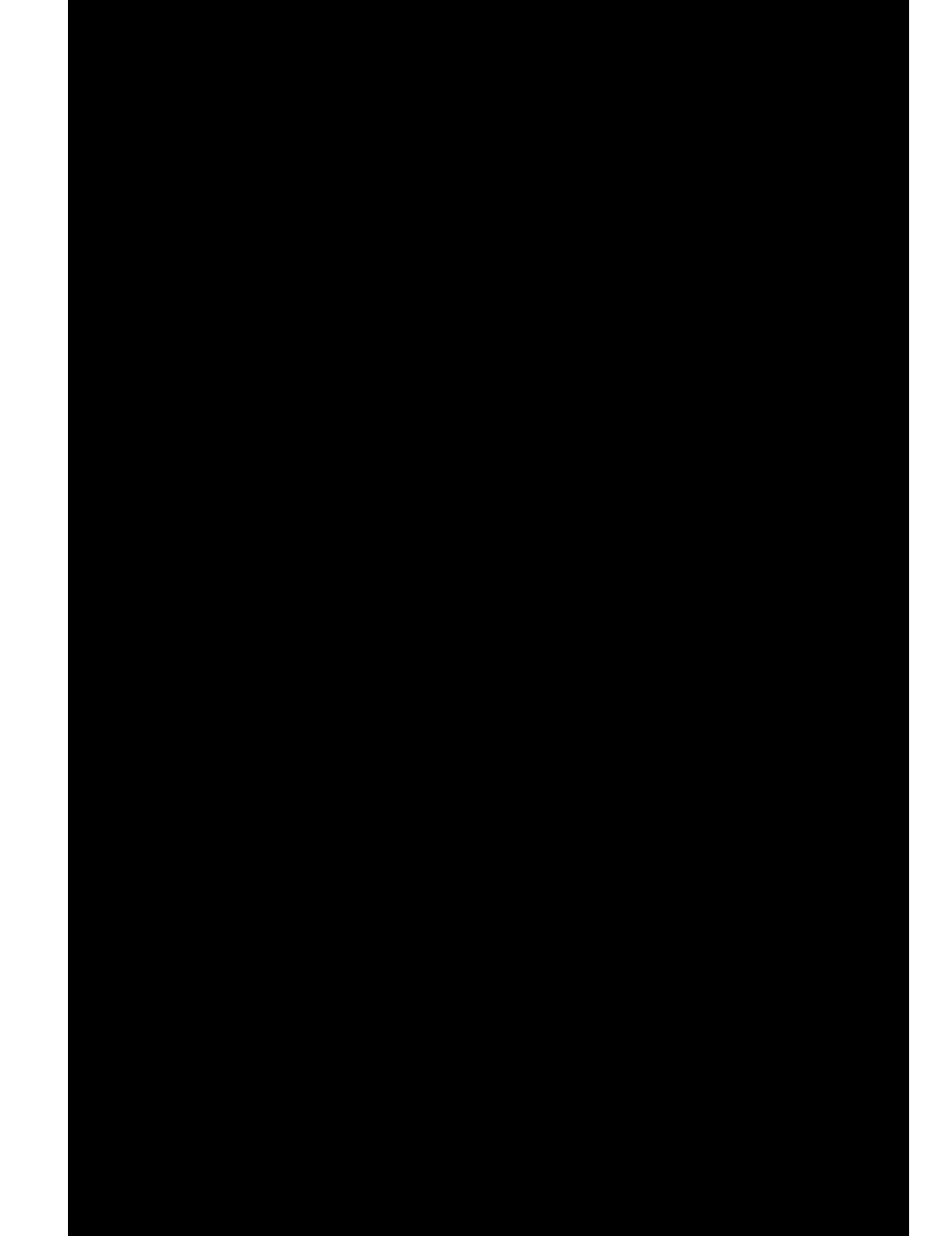

What is claimed is:

1. In a portable device for weighing objects of the type having a supporting frame and indicator means disposed on said frame, said indicator means having an internal resilient means for causing said indicator means to provide a reading proportional to the weight of an object, the improvement comprising:
    (a) activator probe means extending from said indicator means and slidably mounted thereon for engaging said internal resilient means;
    (b) resilient measuring means attached to said frame for supporting the weight of said object, said resilient measuring means disposed in an amount of tension sufficient to cause the calibration curve of the device to be substantially linear; and
    (c) an extension member disposed within said resilient measuring means, said extension member abutting said activator probe means, said extension member and said resilient measuring means applying a compressive force to said activator probe means to cause said internal resilient means to be compressed prior to weighing an object.

2. The device of claim 1 wherein said internal resilient means pre-loads said resilient measuring means through said activator probe and said extension member when said indicator reads zero.

3. The device of claim 1 wherein said indicator has a resolution of one part in 500.

4. The device of claim 1 wherein said indicator has a resolution of one part in 1000.

5. The device of claim 3 wherein said resilient load measuring means comprises a tension spring having a plurality of turns.

6. The device of claim 5 wherein said spring is self-aligning.

7. The device of claim 6 wherein said extension member is axially disposed within said tension spring.

8. The device of claim 7 wherein said frame comprises a collar.

9. The device of claim 8 wherein said tension spring is removably fastened to said collar.

10. The device of claim 9 further comprising calibration means having a calibration cylinder for varying the gradient of said spring.

11. The device of claim 10 wherein said calibration cylinder is axially disposed within said tension spring.

12. The device of claim 11 wherein said frame comprises a handle for grasping said device.

13. The device of claim 11 wherein said activator probe means is disposed through an aperture of the collar of said frame.

14. The device of claim 13 wherein said calibration means comprises an object holding apparatus disposed at a lower end of said spring.

15. The device of claim 14 wherein said holding apparatus comprises a hook.

16. The device of claim 14 wherein said holding apparatus comprises a rod portion disposed in threaded engagement with said extension member, whereby a rotation of said holding apparatus causes a linear translation of said rod portion against said extension member, thereby displacing said activator probe means and said internal resilient means to change the zero adjustment of the device.

17. The device of claim 16 wherein said tension spring is attached to said collar at at least two points,